United States Patent [19]

Hsu

[11] Patent Number: 5,141,693
[45] Date of Patent: Aug. 25, 1992

[54] PROCESS FOR IMPROVING THE STRENGTH OF FIBERS FROM ANISOTROPIC-MELT-FORMING POLYESTERS

[75] Inventor: Che-Hsiung Hsu, Wilmington, Del.

[73] Assignee: E. I. Du Pont de Nemours and Company, Wilmington, Del.

[21] Appl. No.: 639,068

[22] Filed: Jan. 9, 1991

[51] Int. Cl.⁵ .................................. D01F 6/62
[52] U.S. Cl. ..................... 264/211.14; 264/211.17; 264/234; 264/345
[58] Field of Search ............. 264/211, 211.14, 211.17, 264/234, 345

[56] References Cited

U.S. PATENT DOCUMENTS

| | | | |
|---|---|---|---|
| 4,118,372 | 10/1978 | Schaefgen | 528/190 |
| 4,183,895 | 1/1980 | Luise | 264/345 |
| 4,332,759 | 6/1982 | Ide | 264/205 |
| 4,412,058 | 10/1983 | Siemionko | 528/191 |
| 4,424,184 | 1/1984 | Eskridge et al. | 264/235 |
| 4,574,066 | 3/1986 | Gibbon et al. | 264/85 |

Primary Examiner—Hubert C. Lorin

[57] ABSTRACT

A process for improving the strength of fibers from anisotropic-melt-forming polyesters involves polymerization of the polyester precursors in the presence of defined amounts of lithium chloride or acetate followed by melt-spinning the polyester into fiber and subjecting the fiber to a specified heat treatment.

2 Claims, No Drawings

PROCESS FOR IMPROVING THE STRENGTH OF FIBERS FROM ANISOTROPIC-MELT-FORMING POLYESTERS

BACKGROUND OF THE INVENTION

The heat-strengthening of yarn spun from optically anisotropic melt-forming polyesters has been known for some time (see Luise U.S. Pat. No. 4,183,895). While the optimum temperature and period of heating will vary according to the chemical nature of the polymer and its molecular weight, it has been a common objective to reduce both the time and temperature required for heat strengthening and yet obtain the best properties. To this end, it has been proposed to coat the as-spun fiber with certain inorganic compounds before heat treatment (See Eskridge et al. U.S. Pat. No. 4,424,184). U.S. Pat. No. 4,574,066 suggests the incorporation of a catalytic quantity of a potassium salt into a polymerization system for production of poly (6-oxy-2-naphthoate-4-oxybenzoate), followed by the extrusion of the polymer into fiber and subsequent heat treatment. This procedure is said to provide accelerated heat strengthening.

Anisotropic melt-forming copolyesters from chlorohydroquinone diacetate, 4,4'-dihydroxybiphenyl diacetate and a mixture of isophthalic and terephthalic acids are known in the art. (See Siemionko U.S. Pat. No. 4,412,058). The present invention provides an improvement in the process of heat strengthening fiber of this copolyester as well as other fibers formed from liquid crystalline polyesters.

SUMMARY OF THE INVENTION

This invention provides a process for preparing a high strength fiber from an optically anisotropic melt forming polyester comprising polymerizing the precursor aromatic dicarboxylic acids, aromatic diols and/or hydroxyaromatic acids or their functional equivalents in the presence of a salt selected from the group of lithium chloride and lithium acetate, in an amount providing 5 to 40 equivalents of lithium per million grams of polyester to yield a polyester of fiber forming molecular weight, melt spinning the polymer into filaments and heating the filaments under an inert atmosphere at a temperature above 250° C. and for a time sufficient to increase the tenacity of the filaments by at least 50% to a level above 10 g/d.

DETAILED DESCRIPTION OF THE INVENTION

The process of this invention is based on the discovery that certain lithium compounds in defined proportions, when incorporated in an anisotropic melt forming polyester precursor mix, will result in a polymer that can be melt spun into fiber and heat strengthened in an accelerated fashion or if desired to high levels of tenacity at temperatures lower than those required in the absence of the lithium salt. Moreover, as applied to the preparation of the copolyester formed from chlorohydroquinone 4,4'-dihydroxybiphenyl and a mixture of isophthalic and terephthalic acids, or their functional equivalents, this invention results in whiter polymers than are obtained in the absence of the lithium salts, thus indicating less degradation. Further, it has also been discovered that the concentration of the lithium salt has a marked effect on the results obtained.

The polymerization of precursors suitable for preparation of anisotropic melt forming polyesters is well-known (see Schaefgen U.S. Pat. No. 4,118,372; Siemionko U.S. Pat. No. 4,412,058 etc.).

The polyesters may be prepared by standard melt polymerization techniques from the reactant precursors in such proportions to provide the desired proportions of moieties. Details of the procedure are found in the examples below. In general, a mixture of monomers and an effective amount of lithium salt is heated with stirring, under nitrogen in a 250 ml 3-necked flask or polymerization tube in a Wood's metal bath or other suitable heating medium from approximately 250° C. to 330°-380° C. Polymerization is continued for up to a total of 0.5 to one hour or longer if necessary until a polymer of fiber-forming molecular weight is obtained. Usually a vacuum is applied to obtain a final product with high molecular weight.

The polyesters may be spun into filaments by conventional melt-spinning techniques without substantial degradation. In the examples below, filaments were prepared by melt-spinning into a quenching atmosphere of air or nitrogen and collected at a windup speed specified in the example.

The spun filaments may be subjected to heat treatment in an oven while relaxed to provide high strength filaments useful for a variety of industrial applications such as plastic and rubber reinforcement. In the heat-treating process, loosely collected filaments (on soft, yielding bobbins, as skeins, as piddled packages, etc.) are usually heated in an inert atmosphere that is continuously purged by flow of inert gas through the oven to remove by-products from the vicinity of the filament as taught in Luise U.S. Pat. No. 4,183,895. Temperatures approaching the fusion point but sufficiently below to prevent interfilament fusion are employed. Preferably, the maximum temperature is reached in a stepwise fashion.

Both lithium chloride and lithium acetate have been used as heat strengthening accelerators in this invention. It is important that these salts be used in amounts to provide 5 to 40 equivalents of lithium per million grams of polyester. It has been found that if the upper limit is exceeded, the beneficial effect is reduced considerably as noted in Comparative Example E below.

The experimental evidence presented below are based on the use of lithium chloride or lithium acetate in the polymerization of the copolyesters described in Siemionko U.S. Pat. No. 4,412,058, namely, those formed from chlorohydroquinone, 4,4'-dihydroxybiphenyl and a mixture of isophthalic and terephthalic acids or their functional equivalents. However, it is believed that similar results will be obtained with other anisotropic melt-forming polyesters.

TEST PROCEDURES

Inherent viscosity, $\eta_{inh}$, as reported in the examples, is defined by the following equation:

$$\eta_{inh} = \frac{\ln(\eta_{rel})}{C}$$

where $\eta_{rel}$ is the relative viscosity and C is the concentration in grams of polymer per deciliter of solvent, 0.1 g in 100 ml. (Thus, the units for inherent viscosity are dl/g.) The relative viscosity, $\eta_{rel}$, is determined by dividing the flow time of the dilute solution in a capillary viscometer by the flow time for the pure solvent. The flow times are determined at 45° C. The solvent is pentafluorophenol (PFP).

Tensile measurements, as reported in the examples, were made on 10-filament yarns using a recording stress-strain analyzer at 21° C. (70° F.) and 65 percent relative humidity using 3 turns-per-inch twist and a gauge length of 5 inches (12.7 cm) at a 10 percent per minute strain rate. T is tenacity at break in grams per denier (gpd), M is the initial modulus in gpd and E is the break elongation in percent.

The examples below, with the exception of the comparative examples are illustrative and are not to be construed as limiting.

EXAMPLE 1

Preparation and Heat-Treatment of Lithium Chloride Containing Fiber

A three-neck 250 ml flask was charged with the following ingredients: 57.57 g (0.252 mole) chlorohydroquinone diacetate (5 mole % excess with respect to terephthalic acid and isophthalic acid); 17.01 g (0.063 mole) 4,4'-dihydroxybiphenyl diacetate (5 mole % excess); 39.84 g (0.0240 mole) terephthalic acid; 9.96 g (0.06 mole) isophthalic acid; 0.026 g (0.0006 mole) lithium chloride.

The flask with the well mixed ingredients was fitted with: (1) a glass stirrer extending through a pressure-tight resin bushing, (2) a tubing inlet for nitrogen or vacuum, (3) a short glass condensation tube connected to a small flask chilled with dry ice/acetone mixture for collecting acetic acid by-product. The reaction flask, purged continuously with nitrogen, was immersed in a Wood's metal bath preheated to 300° C. The bath temperature dropped to about 270° C. in three minutes after the immersion. It was then raised to 320° C. in 9 minutes as acetic acid distilled out and, immediately after, raised to 340° C. in 6 minutes. After 2 minutes at 340° C., vacuum was applied to reduce the pressure gradually from atmospheric to less than 1 mm of mercury. Nine minutes after the vacuum was applied the polymer melt became very viscous and pearlescent. The vacuum was then removed and a nitrogen atmosphere introduced before taking the flask out of the bath. Besides the acetic acid collected in the condenser, there were sublimates deposited on the flask and condenser. The sublimates resulted from the excess of chlorohydroquinone diacetate and 4,4'-dihydroxybiphenyl diacetate. The polymerization yielded 70 g polymer which was light tan in color. The solidified polymer was ground into flakes. Part of the polymer flakes was molded into a ⅜ inch solid cylinder plug for a press melt spinning. The polymer plug was inserted in a spin cell to which a filtration pad, 20 mesh screen/325 mesh screen/metal powder/Dynalloy/20 mesh screen, and a 10 hole (9 mil diameter and 27 mil length) spinneret was attached. The spin cell, filtration pad, and spinneret were kept at 310° C., 315° C. and 320° C., respectively. The filaments which were spun through the spinneret were quenched in air and collected on a bobbin at a wind-up speed of 500 or 1,000 yard/min. The collected 10-filament yarn is very light in color and has an inherent viscosity of 1.8 (1 mg/ml in pentafluorophenol at 45° C.). The 10-filament yarn has a denier/T/E/M (5 inch gauge length, avg. of 6 breaks) of 61.0/5.5/1.4/503.

Several short pieces (about 20 inches) of the yarn were placed in a tray for heat-treatment in an oven which was constantly purged with nitrogen to exclude oxygen. The following programmed cycle was used: RT (room temperature) to 200° C. in 2 hrs; 200° C. to 306° C. in 7.3 hrs; held at 306° C. for 7.5 hrs; 306° C. to RT in 2 hrs. (This cycle is termed a long cycle.) The heat-treated yarn sample has a T/E/M of 27.3 gpd/3.9%/521 gpd. The tenacity, T, is much higher than that of the as-spun yarn. Several pieces of the yarn were heat-treated according to the following short cycle: RT to 240° C. in 15 minutes; 240° C. to 305° C. in 20 minutes; held at the maximum temperature for 20 minutes; and cooled rapidly by shutting down electrical power. The heat-treated sample has a T/E/M of 26.0/3.9%/513, almost equivalent to the T/E/M of the long cycle treated yarn. This result shows that lithium chloride is a very effective accelerator for heat strengthening the yarn. Even at short cycle lower maximum heat-treating temperatures, the added lithium chloride was still very effective in accelerating heat-strengthening. For example, maintaining the yarn at a maximum temperature of 293° C. for 30 minutes gave T/E/M of 25 gpd/3.87%/ 493.7 gpd, while 50 minutes at 293° C. gave T/E/M of 26.1 gpd/3.9%/512.7 gpd. Surprisingly, the heat-treated yarn sample was soluble in PFP (<1 mg in 1 ml PFP), indicating that heat-treatment in the presence of lithium chloride causes less degradation. (See comparative Example A).

COMPARATIVE EXAMPLE A

No additive added to polymerization mixture

The polymer preparation procedure of Example 1 was closely followed except that lithium chloride was not added. The amount of each monomer was the same as that described in Example 1. The polymerization yielded 70 g polymer. (Inherent viscosity 1.8.) The polymer was much darker than the polymer made with lithium chloride. It was spun in the same manner as that described in Example 1. The long heat-treatment cycle described in Example 1 yielded yarn with a T/E/M of 25.0/3.7/541; however, the short heat-treatment cycle produced yarn with a T/E/M of only 8.2/1.8/491, which is much lower than the lithium chloride heat-treated yarns. Furthermore, the yarn heat-treated with the short cycle was not soluble in PFP in spite of its low tenacity.

COMPARATIVE EXAMPLE B

KI added to polymerization mixture 0.06 g potassium iodide was added to the mixture of monomers, each with the same weight, as described in Example 1. The polymerization and melt spinning procedures described in Example 1 were followed closely. The polymerization yielded 67 g polymer. The polymer was much darker than the polymer made with lithium chloride and had an inherent viscosity of 1.9. The long heat-treatment cycle described in Example 1 yielded yarn with a T/E/M of 16.8/2.5/619. The tenacity is much lower than that (26.0 gpd) obtained in Example 1. The KI may have degraded the polymer, resulting in a lower tenacity.

COMPARATIVE EXAMPLE C

NaCl added to polymerization mixture

Comparative Examples B was repeated except that 0.045 g sodium chloride was added in place of KI. The polymerization yielded 76 g polymer The polymer had an inherent viscosity of 1.8. The long and short heat-treatment cycles described in Example 1 yielded yarns having T/E/M of 23.9/3.6/530 and 12.9/2.7/482, respectively. The tenacities are both lower than those described in Example 1.

EXAMPLE 2

Lithium acetate added to polymerization mixture

Example 1 was repeated except that 0.065 g lithium acetate was added in place of lithium chloride. The polymerization yielded 72 g polymer. The polymer had an inherent viscosity of 2.0. The long and short heat-treatment cycles described in Example 1 yielded yarns with T/E/M of 26.7/3.8/537 and 23.4/3.7/482, respectively. The tenacities clearly show that lithium acetate is nearly as good as lithium chloride as a heat-strengthening catalyst.

COMPARATIVE EXAMPLE D

Sodium acetate added to polymerization mixture

Comparative Example C was repeated except that 0.06 g sodium acetate was added in place of NaCl. The polymerization yielded 72 g polymer which has an inherent viscosity of 2.2. The long and short heat-treatment cycles described in Example 1 yielded yarns with T/E/M of 1.6/3.4/524 and 20.1/3.4/482, respectively. Both tenacities are lower than those shown in Examples 1 and 2.

COMPARATIVE EXAMPLE E

High LiCl Concentration

Instead of 0.026 g lithium chloride used in Example 1, 0.156 g was added to a mixture of the monomers with the weight of each monomer described in Example 1. The polymerization and melt spinning procedures described in Example 1 were followed closely. The polymerization yielded 60 g polymer. The long and short heat-treatment cycles described n Example 1 yielded yarns with T/E/M of 13.6/2.4/554 and 17.2/3.0/496, respectively. The tenacities obtained are lower than those shown in Example 1 at comparable heat treatments.

I claim:

1. A process for preparing a high strength fiber from an optionally anisotropic-melt-forming polyester comprising polymerizing aromatic dicarboxylic acid and aromatic diol or hydroxyaromatic acid, or mixtures of aromatic dicarboxylic acid, aromatic diol and hydroxyaromatic acid, or the functional equivalents of such reactants to form the polyester, in the presence of a salt selected from the group consisting of lithium chloride and lithium acetate in an amount providing 5 to 40 equivalents of lithium per million grams of the polyester, to yield a polyester of fiber-forming molecular weight, melt-spinning the polymer into filaments and heating the filaments under an inert atmosphere at a temperature above 250° C. and for a time sufficient to increase the tenacity of the filaments by at least 50% and to a level above 10 g/d.

2. The process of claim 1 wherein the polymer is formed from chlorohydroquinone diacetate, 4,4'-dihydroxybiphenyl diacetate and a mixture of isophthalic and terephthalic acids.

* * * * *